(12) United States Patent
Kelly et al.

(10) Patent No.: US 10,714,998 B2
(45) Date of Patent: Jul. 14, 2020

(54) RETENTION SLEEVE AND BALANCE STRATEGY FOR A HIGH SPEED PERMANENT MAGNET ROTOR

(71) Applicant: BorgWarner Inc., Auburn Hills, MI (US)

(72) Inventors: Allan D. Kelly, Hendersonville, NC (US); Charles J. Kurle, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 105 days.

(21) Appl. No.: 15/180,509

(22) Filed: Jun. 13, 2016

(65) Prior Publication Data
US 2017/0358964 A1  Dec. 14, 2017

(51) Int. Cl.
*H02K 1/27* (2006.01)
*H02K 1/28* (2006.01)
*H02K 7/04* (2006.01)
*H02K 15/16* (2006.01)

(52) U.S. Cl.
CPC ............ *H02K 1/28* (2013.01); *H02K 1/278* (2013.01); *H02K 1/2733* (2013.01); *H02K 1/2753* (2013.01); *H02K 7/04* (2013.01); *H02K 15/165* (2013.01)

(58) Field of Classification Search
CPC .......... H02K 1/27; H02K 1/28; H02K 1/2753; H02K 1/2733; H02K 7/04; H02K 15/165
USPC ..................... 310/156.28, 216.114
See application file for complete search history.

(56) References Cited

U.S. PATENT DOCUMENTS

| | | | | |
|---|---|---|---|---|
| 4,433,261 A | * | 2/1984 | Nashiki | H02K 1/278 310/156.28 |
| 4,674,178 A | * | 6/1987 | Patel | H02K 1/278 29/598 |
| 4,742,259 A | * | 5/1988 | Schaefer | H02K 1/278 228/173.1 |
| 5,780,945 A | * | 7/1998 | Caviglia | H02K 15/165 310/216.075 |
| 7,786,628 B2 | | 8/2010 | Childe et al. | |
| 7,834,504 B2 | | 11/2010 | Shibui et al. | |
| 7,982,358 B2 | | 7/2011 | York et al. | |
| 8,253,298 B2 | | 8/2012 | Saban et al. | |
| 8,294,319 B2 | | 10/2012 | Shibui et al. | |

(Continued)

FOREIGN PATENT DOCUMENTS

| | | |
|---|---|---|
| CN | 202145607 U | 2/2012 |
| CN | 202218127 U | 5/2012 |

(Continued)

OTHER PUBLICATIONS

U.S. Appl. No. 14/643,485, filed Mar. 10, 2015, Title:Magnet Decoupling Device for Electric Assist Turbocharger, First Named Inventor: Charles J. Kurle.

(Continued)

*Primary Examiner* — John K Kim
(74) *Attorney, Agent, or Firm* — Young Basile Hanlon & MacFarlane, P.C.

(57) ABSTRACT

A method for reducing stress concentration on a rotor sleeve during balance cutting comprising: providing an axial protrusion to an outer diameter of a first end cap and a second end cap of a rotor assembly; and radially cutting at least one of the sleeve or the axial protrusion to balance the rotor assembly.

4 Claims, 4 Drawing Sheets

(56) References Cited

U.S. PATENT DOCUMENTS

| | | | |
|---|---|---|---|
| 8,698,367 B2 | 4/2014 | Sortore et al. | |
| 8,756,794 B2 | 6/2014 | Ions et al. | |
| 8,933,604 B2 | 1/2015 | Ions et al. | |
| 9,729,032 B2* | 8/2017 | Barton | H02K 15/165 |
| 2008/0203843 A1* | 8/2008 | Martin | H02K 1/28 |
| | | | 310/156.28 |
| 2010/0117473 A1 | 5/2010 | Masoudipour et al. | |
| 2010/0171383 A1* | 7/2010 | Petrov | H02K 1/02 |
| | | | 310/156.28 |
| 2012/0206008 A1* | 8/2012 | Blanc | H02K 1/2773 |
| | | | 310/156.48 |
| 2014/0165777 A1 | 6/2014 | Andrews et al. | |
| 2014/0375166 A1* | 12/2014 | Barton | H02K 7/04 |
| | | | 310/216.116 |
| 2015/0061441 A1 | 3/2015 | Figgins et al. | |
| 2017/0358964 A1* | 12/2017 | Kelly | H02K 1/278 |

FOREIGN PATENT DOCUMENTS

| | | |
|---|---|---|
| CN | 103779987 A | 5/2014 |
| CN | 205123526 U | 3/2016 |
| EP | 2031742 A1 | 3/2009 |
| GB | 2509738 | 7/2015 |
| JP | H0454846 A | 2/1992 |
| JP | 2010004661 A | 1/2010 |

OTHER PUBLICATIONS

International Search Report and Written Opinion; dated Aug. 21, 2017; for International Application No. PCT/US2017/036669; 12 pages.

Chinese Office Action dated Jan. 6, 2020; Application No. 201780036546.4; Applicant: BorgWarner Inc.; 12 pages.

European Office Action dated Jan. 16, 2020; Application No. 17 731 416.8-1201; Applicant: BorgWarner Inc.; 7 pages.

* cited by examiner

RETENTION SLEEVE AND BALANCE STRATEGY FOR A HIGH SPEED PERMANENT MAGNET ROTOR

TECHNICAL FIELD

The field to which the disclosure generally relates to includes turbo machines.

BACKGROUND

A turbo machine may include an electric motor.

SUMMARY OF ILLUSTRATIVE VARIATIONS

A number of variations may include a method for reducing stress concentration on a rotor sleeve during assembly and balancing of a rotor assembly comprising: providing a first end cap and a second end cap which each extend radially from a rotor core and which are spaced laterally from one another and define an annular cavity, wherein the first end cap includes a first axial protrusion and the second end cap includes a second axial protrusion which each extend away from the annular cavity; providing a magnet within the annular cavity; placing a sleeve onto the first end cap and the second end cap to enclose and compress the magnet; and radially cutting at least one of the sleeve, the first axial protrusion, or the second axial protrusion to balance the rotor assembly.

A number of variations may include a method for reducing stress concentration on a rotor sleeve during balance cutting comprising: providing an axial protrusion to an outer diameter of a first end cap and a second end cap of a rotor assembly; and radially cutting at least one of the sleeve or the axial protrusion to balance the rotor assembly.

A number of variations may include a rotor assembly comprising: a rotor core, wherein the rotor core is constructed and arranged to accommodate a shaft; a first end cap and a second end cap which extend radially outward from the rotor core and which are spaced laterally from one another and define an annular cavity; at least one magnet constructed and arranged to fit within the annular cavity; a sleeve, wherein the sleeve is constructed and arranged to compress the at least one magnet; and wherein the first end cap includes a first axial protrusion and the second end cap includes a second axial protrusion which each extend away from the annular cavity.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 2:
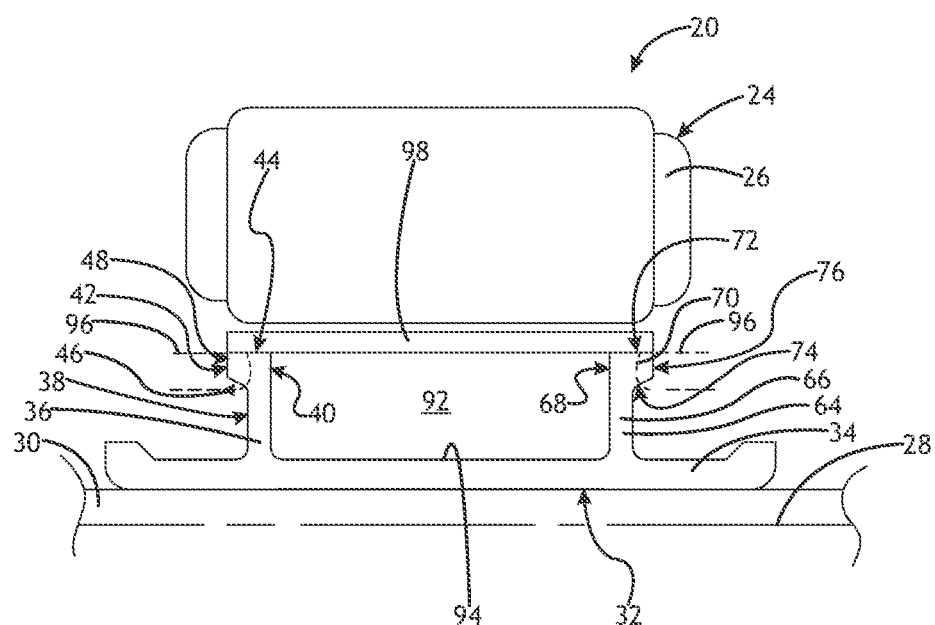
FIG. 2 illustrates a partial section view of a rotor assembly and stator assembly according to a number of variations.

Referring to FIG. 2, in a number of variations, an electric motor 20 may include a rotor assembly 32 which may be driven by a stator assembly 24. In a number of variations, the stator assembly 24 may operate as an electromagnet which may be energized by field windings 26. The rotor assembly 32 may be rotated by the stator assembly 24 by the interaction between the field windings 26 and magnetic fields in the rotor assembly 32 which may produce a torque about an axis of rotation 28 of the rotor assembly 32. In a number of variations, one or more permanent magnets 92 may be used to provide the magnetic field. The term "radial" used hereafter refers to a direction which extends from or is perpendicular to the axis of rotation 28 of the shaft 30 and the term "axial" as used hereafter refers to a direction along or parallel to the axis of rotation 28 of the shaft 30.

Figure 1:
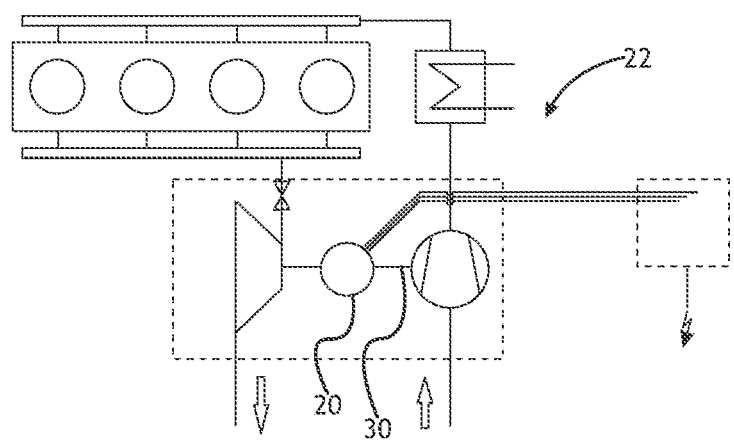
FIG. 1 illustrates a schematic of an electric assist turbocharger system according to a number of variations.

Referring to FIGS. 2-7, in a number of variations, a rotor assembly 32 may include a rotor core 34 which may be a hollow cylinder and may be constructed and arranged to accommodate a shaft 30 (a variation of which is illustrated in FIG. 2) which may be operatively connected to any number of systems including, but not limited to, turbochargers 22, a variation of which is illustrated in FIG. 1, eBoosters, and waste heat recovery machines. The rotor core 34 may comprise any number of durable high strength non-magnetic materials including, but not limited to, titanium or a steel alloy including, but not limited to, high nickel steel. In a number of variations, a first and second end cap 36, 64 may extend radially outward from the rotor core 34 and may be constructed and arranged to form an annular cavity 94 with the rotor core 34 defined by a surface of the rotor core 34 and the first and second end caps 36, 64. The annular cavity 94 may be constructed and arranged to accommodate one or more permanent magnets 92. The rotor core 34 and the first and second end caps 36, 64 may be one single continuous piece with the rotor core 34, a variation of which is illustrated in FIG. 2, or may be separate components which may be attached to the rotor core 34, a variation of which is illustrated in FIG. 8. The first and second end caps 36, 64 may be attached to the rotor core 34 in any number of variations including, but not limited to, press-fitting the first end cap 36 into a first nub 104 in the rotor core 34 and press-fitting the second end cap 64 into a second nub 106 in the rotor core 34. The first nub 104 and the second nub 106 may be constructed and arranged to have an opening 108 which has the same diameter as the end surface 110 of the first and second end caps 36, 64.

In a number of variations, the rotor assembly 32 may include a sleeve 98 which may be a hollow cylinder and may be constructed and arranged to fit with a stator assembly 24, a variation of which is illustrated in FIG. 2. The sleeve 98 may also be constructed and arranged to surround the annular cavity 94 and the one or more permanent magnets 92 to compress the one or more magnets 92 and which may protect and limit stress on the one or more permanent magnets 92 which may be subject to extreme forces due to high rotational speed of the rotor assembly 32. The sleeve 98 may comprise any number of durable materials including, but not limited to, fiber reinforced composite material which may be a fiber reinforced polymer. In a number of variations, fibers in the sleeve 98 may be oriented to influence the stiffness of the sleeve 98.

During manufacturing, testing of the rotating balance of the rotor assembly 32 may be performed. During the rotating balance test, the balance of the rotor assembly 32 may be adjusted by radially cutting 96 a portion of the rotor assembly 32. In a number of variations, at least one of the end caps 36, 64 and/or the sleeve 98 may be constructed and arranged to reduce or prevent creation of a failure point or local stress concentration on the sleeve 98 resulting from the balance cut 96. The configuration of the end caps 36, 64 and/or the sleeve 98 may also reduce stress on the sleeve 98 caused by high rotational speeds and/or stress from an interference fit between the end caps 36, 64 and the sleeve 98.

Referring to FIG. 2, in a number of variations, the first end cap 36 may include a first body portion 38 which may extend radially outward from the rotor core 34 and a lip or protrusion 42 which may extend axially outward from an outer end 40 of the body portion 38 away from the annular cavity 94. In a number of variations, the lip or protrusion 42 may include an outer surface 44, an inner surface 46, and an axial surface 48 which extends therebetween. The outer surface 44 of the lip or protrusion 42 may be perpendicular to the body portion 38 so that it may be flush with the sleeve 98. The inner surface 46 of the lip or protrusion 42 may also be perpendicular to the body portion 38 or may extend at an upward angle toward the outer surface 44. The second end cap 64 may be symmetrically opposite of the first end cap 36 and may also include a body portion 66 which may extend radially outward from the rotor core 34 and a lip or protrusion 70 which may extend axially outward from an outer end 68 of the body portion 66 away from the annular cavity 94. In a number of variations, the lip or protrusion 70 may include an outer surface 72, an inner surface 74, and an axial surface 76 extending therebetween. The outer surface 72 of the lip or protrusion 70 may be perpendicular to the body portion 66 so that the outer surface 72 may be flush with the sleeve 98. The inner surface 74 of the lip or protrusion 70 may also be perpendicular to the body portion 66 or may extend at an upward angle toward the outer surface 72 to form a taper. The lip or protrusion 42, 70 on the first and second end caps 36, 64 may provide additional material at the outer diameter of the end caps 36, 64 which may prevent or reduce rotor bending stiffness. The additional material may also allow for a balance cut 96 to be made through at least one of the first end cap 36, the second end cap 64, or the sleeve 98 anywhere axially outward from the dotted line illustrating the balance cut 96 and may prevent or reduce stress concentration on the sleeve 98, particularly for sleeves 98 comprising carbon fiber.

Figure 3:
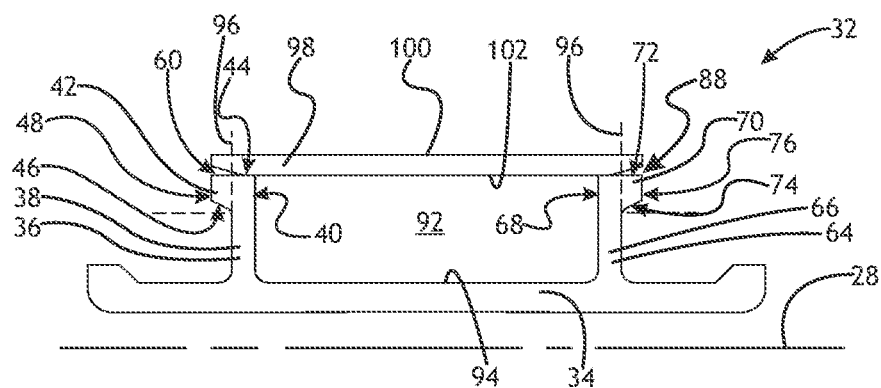
FIG. 3 illustrates a partial section view of a rotor assembly according to a number of variations.

Referring to FIG. 3, in a number of variations, the sleeve 98 may include an outer surface 100 and an inner surface 102. The inner surface 102 may be constructed and arranged to angle upward and may form a taper at each end of the sleeve 98. In a number of variations, the construction of the sleeve 98 and the end caps 36, 64 may form a cavity or gap 60, 88 between the sleeve 98 and each end cap 36, 64 defined by a portion of the inner surface 102 of the sleeve 98 and an outer surface 44, 72 of the end cap 36, 64. The gaps 60, 88 between the sleeve 98 and the end caps 36, 64 may allow for a radial balance cut 96 to be made through at least one of the first end cap 36, the second end cap 64, or the sleeve 98 on or axially outward from the dotted line illustrating the balance cut 96, and may prevent or reduce stress concentration on the sleeve 98 during balance cutting.

Figure 4:
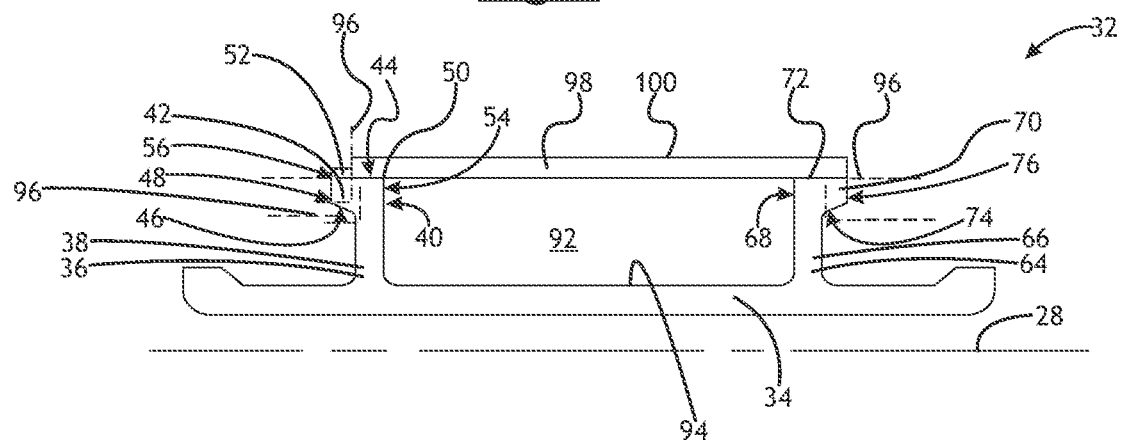
FIG. 4 illustrates a partial section view of a rotor assembly according to a number of variations.

Referring to FIG. 4, in a number of variations, the outer surface 44 of the lip or protrusion 42 on the first end cap 36 may also include a second radial protrusion 52 which may extend outward from a second end 56 of the outer surface 44. The second radial protrusion 52 may be perpendicular to the outer surface 44 and may extend past at least a portion of the height of the sleeve 98 so that it may prevent the sleeve 98 from extending past the first end cap 36. In a number of variations, the second radial protrusion 52 may extend at least twice the distance of the first radial protrusion 50. In a number of variations, the second radial protrusion 52 may be constructed and arranged to provide an axial stop for the sleeve 98 which may improve the accuracy of the axial position of the sleeve 98. The second radial protrusion 52 extending from the first end cap 36 is described above for illustrative purposes only and it is noted that the second radial protrusion 52 may be provided on the second end cap 64 instead.

Figure 5:
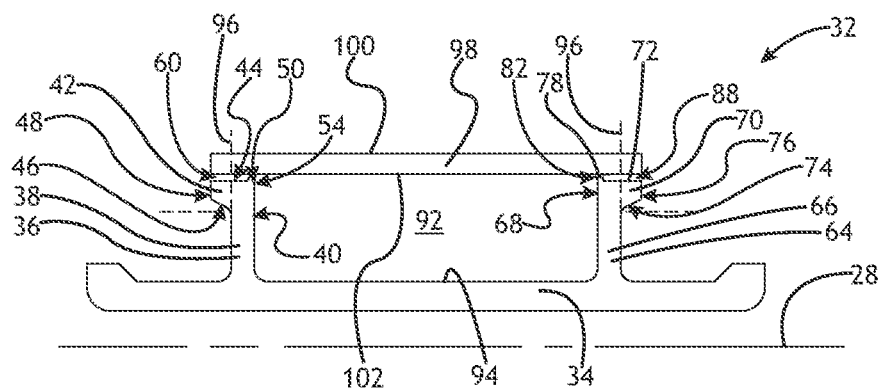
FIG. 5 illustrates a partial section view of a rotor assembly according to a number of variations.

Referring to FIG. 5, in a number of variations, the first end cap 36 may include a first body portion 38 which may extend radially outward from the rotor core 34 and a lip or protrusion 42 which may extend axially outward from an outer end 40 of the body portion 38. In a number of variations, the lip or protrusion 42 may include an outer surface 44, an inner surface 46, and an axial surface 48 which extends therebetween. In a number of variations, the outer surface 44 of the lip or protrusion 42 may be perpendicular to the body portion 38 so that it may be parallel with the outer surface 100 of the sleeve 98. In a number of variations, the outer surface 44 may also include a radial protrusion 50 which may extend outward from a first end 54 of the outer surface 44 immediately adjacent the annular cavity 94. The radial protrusion 50 may be constructed and arranged to create a cavity or gap 60 between the sleeve 98 and the end cap 36 defined by an inner surface 102 of the sleeve 98, radial protrusion 50, and the outer surface 44 of the lip or protrusion 42. The radial protrusion 50 may be perpendicular to the outer surface 44 or may include an angle on one or both sides. The inner surface 46 of the lip or protrusion 42 may also be perpendicular to the body portion 38 or may extend at an upward angle toward the outer surface 44 to form a taper. The second end cap 64 may be symmetrically opposite of the first end cap 36 and may include a body portion 66 which may extend radially outward from the rotor core 34 and a lip or protrusion 70 which may extend axially outward from an outer end 68 of the body portion 66. In a number of variations, the lip or protrusion 70 may include an outer surface 72, an inner surface 74, and an axial surface 76 extending therebetween. The outer surface 72 of the lip or protrusion 70 may be perpendicular to the body portion 66 so that it may be parallel with the inner surface 102 of the sleeve 98. In a number of variations, the outer surface 72 may also include a radial protrusion 78 which may extend outward from a first end 82 of the outer surface 72 immediately adjacent the annular cavity 94. The radial protrusion 78 may be constructed and arranged to create a cavity or gap 88 between the sleeve 98 and the second end cap 64 defined by a portion of the inner surface 102 of the sleeve 98, the radial protrusion 78, and the outer surface 72 of the lip or protrusion 70. The radial protrusion 78 may be perpendicular to the outer surface 72 or may include an angle on one or both sides. The inner surface 74 of the lip or protrusion 70 may also be perpendicular to the body portion 66 or may extend at an upward angle toward the outer surface 72 to form a taper. In a number of variations, the radial protrusions 50, 78 on the first and second end caps 36, 64 may be constructed and arranged so that they may also provide a seal between the sleeve 98 and the first and second end cap 36, 64 which may protect the one or more permanent magnets 92 from contaminants. In a number of variations, the configuration of the first and second end cap 36, 64 may allow a radial balance cut 96 through at least one of the first end cap 36, the second end cap 64, or the sleeve 98 on or axially outward from the dotted line indicating a balance cut 96. The cavity or gap 60, 88 between the sleeve 98 and the end caps 36, 64 may prevent or reduce stress concentration on the sleeve 98 during balance cutting.

Figure 6:
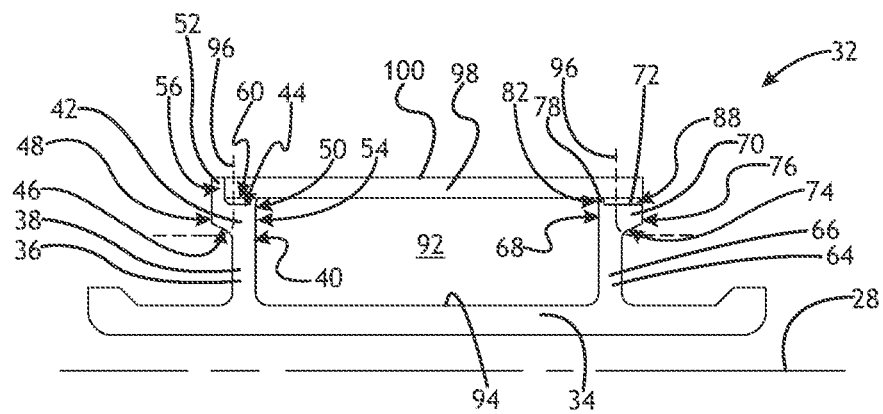
FIG. 6 illustrates a partial section view of a rotor assembly according to a number of variations.

Referring to FIG. 6, in a number of variations, the outer surface 44 of the first end cap 36 may also include a second radial protrusion 52 which may extend outward from a second end 56 of the outer surface 44 and may be perpendicular to the outer surface 44. The second radial protrusion 52 may extend past at least a portion of the height of the sleeve 98 so that it may prevent the sleeve 98 from extending past the first end cap 36. The second radial protrusion 52 extending from the first end cap 36 is described above for illustrative purposes only and it is noted that the second radial protrusion 52 may be provided on the second end cap 64 instead. In a number of variations, the second radial protrusion 52 may extend at least twice the distance of the first radial protrusion 50. The second radial protrusion 52 may be constructed and arranged to provide an axial stop for the sleeve 98 which may improve the accuracy of the axial position of the sleeve 98. In a number of variations, the configuration of the first and second end cap 36, 64 may allow a radial balance cut 96 through at least one of the first end cap 36, the second end cap 64, or the sleeve 98 on or axially outward from the dotted line indicating a balance cut 96.

Figure 7:
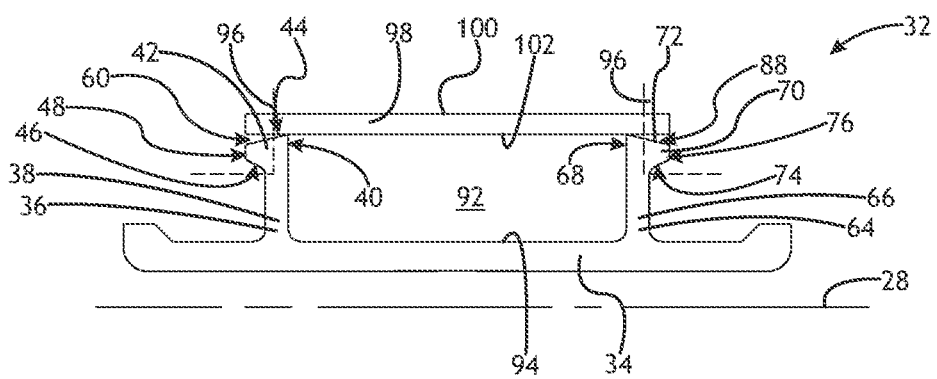
FIG. 7 illustrates a partial section view of a rotor assembly according to a number of variations.
Figure 8:
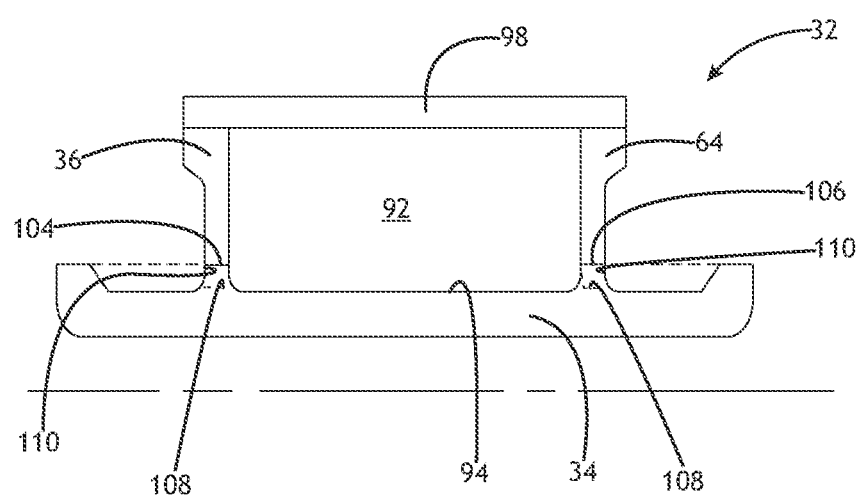
FIG. 8 illustrates a partial section view of a rotor assembly according to a number of variations.

Referring to FIG. 7, in a number of variations, the first end cap 36 may include a first body portion 38 which may extend radially from the rotor core 34 and a lip or protrusion 42 which may extend axially from an outer end 40 of the body portion 38. In a number of variations, the lip or protrusion 42 may include an outer surface 44, an inner surface 46, and an axial surface 48 which extends therebetween. In a number of variations, the outer surface 44 of the lip or protrusion 42 may be angled downward from the body portion 38. The angle of the outer surface 44 may be constructed and arranged so that it creates a cavity or gap 60 between the sleeve 98 and the end cap 36 defined by a portion of the inner surface 102 of the sleeve 98 and the outer surface 44 of the end cap 36. The inner surface 46 of the lip or protrusion 42 may be perpendicular to the body portion 38 or may extend at an upward angle toward the outer surface 44 to form a taper. The second end cap 64 may be symmetrically opposite of the first end cap 36 and may also include a body portion 66 which may extend radially outward from the rotor core 34 and a lip or protrusion 70 which may extend axially outward from an outer end 68 of the body portion 66. In a number of variations, the lip or protrusion 70 may include an outer surface 72, an inner surface 74, and an axial surface 76 extending therebetween. In a number of variations, the outer surface 72 of the lip or protrusion 70 may be angled downward from the body portion 66. The angle of the outer surface 72 may be constructed and arranged so that it creates a cavity or gap 88 between the sleeve 98 and the end cap 64 defined by a portion of the inner surface 102 of the sleeve 98 and the outer surface 72 of the end cap 64. In a number of variations, the lip or protrusions 42, 70 of the first and second end caps 36, 64 may be constructed and arranged so that the radial protrusions 42, 70 provide a seal between the sleeve 98 and the first and second end cap 36, 64 which may protect the one or more permanent magnets 92 from contaminants. In a number of variations, the configuration of the first and second end cap 36, 64 may also allow a radial balance cut 96 through at least one of the first end cap 36, the second end cap 64, or the sleeve 98 on or axially outward from the dotted line indicating a balance cut 96. The cavity or gap 60, 88 between the sleeve 98 and the end caps 36, 64 may prevent or reduce stress concentration on the sleeve 98 during balance cutting.

It is noted that any of the above variations of end caps 36, 64 and sleeves 98 may be combined and/or rearranged in any number of ways without departing from the spirit and scope of the invention.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method for reducing stress concentration on a rotor sleeve during assembly and balancing of a rotor assembly comprising: providing a first end cap and a second end cap which each extend radially from a rotor core and which are spaced laterally from one another and define an annular cavity, wherein the first end cap includes a first axial protrusion and the second end cap includes a second axial protrusion which each extend away from the annular cavity; providing a magnet within the annular cavity; placing a sleeve onto the first end cap and the second end cap to enclose and compress the magnet; and radially cutting at least one of the sleeve, the first axial protrusion, or the second axial protrusion to balance the rotor assembly.

Variation 2 may include a method as set forth in Variation 1 wherein the first end cap is press-fit into a first nub in the rotor core and the second end cap is press-fit into a second nub in the rotor core.

Variation 3 may include a method as set forth in any of Variations 1-2 further comprising providing a gap between an inner radial surface of the sleeve and a surface of the first and the second axial protrusions.

Variation 4 may include method as set forth in any of Variations 1-3 wherein tapering a first end and a second end of the sleeve forms the gap.

Variation 5 may include a method as set forth in any of Variations 1-3 wherein providing a first radial protrusion on the first axial protrusion and a second radial protrusion on the second axial protrusion forms the gap.

Variation 6 may include a method as set forth in any of Variations 1-3 wherein tapering the first axial protrusion on the first end cap and tapering the second axial protrusion on the second end cap forms the gap.

Variation 7 may include a method as set forth in any of Variations 1-6 further comprising axially positioning the sleeve by providing a stop on one of the first end cap or the second end cap.

Variation 8 may include a method for reducing stress concentration on a rotor sleeve during balance cutting comprising: providing an axial protrusion to an outer diameter of a first end cap and a second end cap of a rotor assembly; and radially cutting at least one of the sleeve or the axial protrusion to balance the rotor assembly.

Variation 9 may include a method as set forth in Variation 8 further comprising providing a gap between the sleeve and the axial protrusion.

Variation 10 may include a method as set forth in Variation 9 wherein tapering a first end and a second end of the sleeve forms the gap.

Variation 11 may include a method as set forth in Variation 9 wherein providing a first and second radial protrusion on the axial protrusion forms the gap.

Variation 12 may include a method as set forth in Variation 9 wherein tapering the first axial protrusion on the first end cap and tapering the second axial protrusion on the second end cap forms the gap.

Variation 13 may include a method as set forth in any of Variations 8-12 further comprising axially positioning the sleeve using a stop on one of the first end cap or the second end cap.

Variation 14 may include a rotor assembly comprising: a rotor core, wherein the rotor core is constructed and arranged to accommodate a shaft; a first end cap and a second end cap which extend radially outward from the rotor core and which are spaced laterally from one another and define an annular cavity; at least one magnet constructed and arranged to fit within the annular cavity; a sleeve, wherein the sleeve is constructed and arranged to compress the at least one magnet; and wherein the first end cap includes a first axial protrusion and the second end cap includes a second axial protrusion which each extend away from the annular cavity.

Variation 15 may include a rotor assembly as set forth in Variation 14 wherein the first axial protrusion and the second axial protrusion each include an outer surface, an inner surface, and an axial surface that extends therebetween.

Variation 16 may include a rotor assembly as set forth in Variation 15 wherein the outer surface includes a radial protrusion immediately adjacent the annular cavity and is constructed and arrange to define a gap between an inner surface of the sleeve and a remaining portion of the outer surface opposite of the annular cavity.

Variation 17 may include a rotor assembly as set forth in any of Variations 15-16 wherein the radial protrusion acts as a seal with the inner surface of the sleeve to protect the magnet from containments.

Variation 18 may include a rotor assembly as set forth in any of Variations 14-15 wherein each end of an inner surface of the sleeve is tapered to define a gap between the first axial protrusion and the second axial protrusion.

Variation 19 may include a rotor assembly as set forth in any of Variations 14-18 wherein one of the first end cap or the second end cap includes a radial protrusion constructed and arranged to act as an axial stop for the sleeve.

Variation 20 may include a rotor assembly as set forth in Variation 19 wherein the radial protrusion extends from a first end of the outer surface opposite from the annular cavity.

The above description of select variations within the scope of the invention is merely illustrative in nature and, thus, variations or variants thereof are not to be regarded as a departure from the spirit and scope of the invention.

What is claimed is:

1. A rotor assembly comprising:
   a rotor core, wherein the rotor core is constructed and arranged to accommodate a shaft;
   a first end cap and a second end cap which extend radially outward from the rotor core and which are spaced laterally from one another and define an annular cavity;
   at least one magnet constructed and arranged to fit within the annular cavity;
   a sleeve, wherein the sleeve is constructed and arranged to compress the at least one magnet;
   wherein the first end cap includes a first axial protrusion and the second end cap includes a second axial protrusion which each extend away from the annular cavity;
   wherein the first axial protrusion and the second axial protrusion each include an outer surface, an inner surface, and an axial surface that extends therebetween; and
   wherein the outer surface includes a radial protrusion immediately adjacent the annular cavity and is constructed and arranged to define a gap between an inner surface of the sleeve and a remaining portion of the outer surface opposite of the annular cavity.

2. The rotor assembly of claim 1 wherein the radial protrusion acts as a seal with the inner surface of the sleeve to protect the magnet from containments.

3. A rotor assembly comprising:
   a rotor core, wherein the rotor core is constructed and arranged to accommodate a shaft;
   a first end cap and a second end cap which extend radially outward from the rotor core and which are spaced laterally from one another and define an annular cavity;
   at least one magnet constructed and arranged to fit within the annular cavity;
   a sleeve, wherein the sleeve is constructed and arranged to compress the at least one magnet;
   wherein the first end cap includes a first axial protrusion and the second end cap includes a second axial protrusion which each extend away from the annular cavity;
   wherein the first axial protrusion and the second axial protrusion each include an outer surface, an inner surface, and an axial surface that extends therebetween; and
   wherein each end of an inner surface of the sleeve is tapered to define a gap between the first axial protrusion and the second axial protrusion.

4. A rotor assembly comprising:
   a rotor core, wherein the rotor core is constructed and arranged to accommodate a shaft;
   a first end cap and a second end cap which extend radially outward from the rotor core and which are spaced laterally from one another and define an annular cavity;
   at least one magnet constructed and arranged to fit within the annular cavity;
   a sleeve, wherein the sleeve is constructed and arranged to compress the at least one magnet;
   wherein the first end cap includes a first axial protrusion and the second end cap includes a second axial protrusion which each extend away from the annular cavity;
   wherein one of the first end cap or the second end cap includes a radial protrusion constructed and arranged to act as an axial stop for the sleeve; and
   wherein the radial protrusion extends from a first end of the outer surface opposite from the annular cavity.

* * * * *